United States Patent
Leeson et al.

(10) Patent No.: US 10,129,154 B2
(45) Date of Patent: Nov. 13, 2018

(54) CONTROLLING PACKET FLOW IN A NETWORK

(71) Applicant: UNIVERSITY OF WARWICK, Coventry (GB)

(72) Inventors: Mark Stephen Leeson, Kenilworth (GB); Roger Julien Green, Henlow (GB); Yuen Kwan Mo, Keynes (GB)

(73) Assignee: UNIVERSITY OF WARWICK, Coventry (GB)

( * ) Notice: Subject to any disclaimer, the term of this patent is extended or adjusted under 35 U.S.C. 154(b) by 69 days.

(21) Appl. No.: 15/321,873

(22) PCT Filed: Jun. 26, 2015

(86) PCT No.: PCT/GB2015/051871
§ 371 (c)(1),
(2) Date: Dec. 23, 2016

(87) PCT Pub. No.: WO2015/198068
PCT Pub. Date: Dec. 30, 2015

(65) Prior Publication Data
US 2017/0149668 A1    May 25, 2017

(30) Foreign Application Priority Data
Jun. 26, 2014 (GB) .................................. 1411366.6

(51) Int. Cl.
*H04L 12/28* (2006.01)
*H04L 12/803* (2013.01)
(Continued)

(52) U.S. Cl.
CPC ............ *H04L 47/125* (2013.01); *H04L 47/28* (2013.01); *H04L 47/38* (2013.01)

(58) Field of Classification Search
CPC ........ H04L 47/28; H04L 47/38; H04L 47/125
See application file for complete search history.

(56) References Cited

U.S. PATENT DOCUMENTS 6,307,867 B1 * 10/2001 Roobol ................. H04J 3/1647
                                                    370/342
6,590,897 B1 *  7/2003 Lauffenburger ... H04Q 11/0478
                                                    370/395.6
(Continued)

FOREIGN PATENT DOCUMENTS

EP      1155540 A1    11/2001
WO      01/48987 A1    7/2001

OTHER PUBLICATIONS

International Search Report and Written Opinion dated Sep. 24, 2015, International Application No. PCT/GB2015/051871, pp. 1-12.
(Continued)

*Primary Examiner* — Farah Faroul
(74) *Attorney, Agent, or Firm* — MH2 Technology Law Group, LLP (57) ABSTRACT

A method, processor and system for controlling packet flow in a network provides for selecting a transmission scheme based on a payload rate for payloads arriving at a buffer. The transmission scheme includes data blocks comprising packets each having an associated payload, the data blocks have a variable packet transmission rate and a variable payload per packet ratio. The product of the variable packet transmission rate and the variable payload per packet ratio remains constant. The data blocks are sent to a network switch that deterministically routes the data blocks.

20 Claims, 8 Drawing Sheets

(51) Int. Cl.
*H04L 12/811* (2013.01)
*H04L 12/841* (2013.01)

(56) References Cited

U.S. PATENT DOCUMENTS

| | | | |
|---|---|---|---|
| 6,839,322 B1 * | 1/2005 | Ashwood Smith | H04L 49/25 370/235 |
| 2001/0053157 A1 | 12/2001 | Li | |
| 2003/0112802 A1 | 6/2003 | Ono et al. | |
| 2003/0123476 A1 * | 7/2003 | Shenoi | H04L 12/5601 370/458 |
| 2004/0122864 A1 | 6/2004 | Silagi et al. | |
| 2008/0089221 A1 * | 4/2008 | Bruninghaus | H04L 1/1671 370/203 |
| 2008/0259809 A1 | 10/2008 | Stephan et al. | |
| 2010/0074324 A1 | 3/2010 | Qian et al. | |
| 2012/0201148 A1 | 8/2012 | Sherif et al. | |
| 2013/0155866 A1 | 6/2013 | Sun et al. | |
| 2013/0282807 A1 * | 10/2013 | Rudy | G06F 13/385 709/204 |
| 2014/0129671 A1 | 5/2014 | Baldwin | |
| 2017/0279738 A1 * | 9/2017 | Cai | H04L 67/10 |

OTHER PUBLICATIONS

United Kingdom Search Report dated Dec. 12, 2014, Great Britain Patent Application No. 1411366.6, pp. 1-3.
International Preliminary Report on Patentability dated Jan. 5, 2017, International Application PCT/GB2015/051871, pp. 1-10.

* cited by examiner

CONTROLLING PACKET FLOW IN A NETWORK

CROSS-REFERENCE TO RELATED APPLICATIONS

This application is a U.S. National Stage application of International Application No. PCT/GB2015/051871 filed 26 Jun. 2015, which claims priority to Great Britain Application No. 1411366.6 filed 26 Jun. 2014, the entire disclosures of which are hereby incorporated by reference in their entireties.

FIELD OF THE INVENTION

The present disclosure relates to a method, processor and system for controlling packet flow in a network.

BACKGROUND

The management of packet flow (traffic) in a network can problematic especially in time critical applications such as air traffic control and commodities trading. Architectures that manage network traffic employ buffers that provide a traffic queue and a router that receives the traffic and switches that direct the traffic in the traffic queue to destination nodes. However, the traffic flow rate is variable whilst the bandwidth of a network is fixed. Consequently, the speed of transmission traffic packets may become critically slow which can further result in buffer overflow.

The packets that form the traffic comprise payload bundles and overhead information such as packet network information, Flags, error correction codes, start and end of packet identification codes and an application identifier. This overhead information increases buffer size requirements and buffering delay by encumbering each packet with a larger number of bits than would otherwise be required. Furthermore, the overhead information also restricts the level of freedom for network switching to manage traffic and results in network congestion due to uncertain or unpredictable packet or payload rates.

It is an object of embodiments of the invention to at least mitigate one or more of the problems of the prior art.

SUMMARY OF THE INVENTION

According to an aspect of the invention, there is provided a method for controlling packet flow in a network, the method comprising: storing a plurality of packets in a buffer, the packets originating from a single application and each of the packets comprising one or more payloads; selecting by a flow controller a transmission scheme based on a payload rate for the payloads arriving at the buffer, wherein the transmission scheme includes data blocks comprising packets each having an associated payload, the data blocks having a variable packet transmission rate and a variable payload per packet ratio, and the product of the variable packet transmission rate and the variable payload per packet ratio remains constant; creating the data blocks; and sending the data blocks to a network switch according to the transmission scheme.

According to another aspect of the invention, there is provided a processor for controlling packet flow in a network, the processor comprising: a buffer for storing a plurality of packets, the packets originating from a single application and each of the packets comprising one or more payloads; and a flow controller configured to: select a transmission scheme based on a payload rate for the payloads arriving at the buffer, wherein the transmission scheme includes data blocks comprising packets each with an associated payload, the data blocks having a variable packet transmission rate and a variable payload per packet ratio, and the product of the variable packet transmission rate and the variable payload per packet ratio remains constant; create the data blocks; and send the data blocks to a network switch.

According to further aspect of the invention, there is provided a method for controlling packet flow in a network, the method including: determining at a network switch, a plurality of transmission schemes, each of the transmission schemes being associated with a corresponding buffer that stores a plurality of packets originating from a respective single application and each of the packets comprising one or more payloads, wherein each of the transmission schemes is based on a payload rate for the payloads arriving at the corresponding buffer, and wherein each transmission scheme includes data blocks comprising packets each having an associated payload, the data blocks having a variable packet transmission rate and a variable payload per packet ratio, and the product of the variable packet transmission rate and the variable payload per packet ratio remains constant; determining, at the network switch, an expected time of arrival of each of the data blocks transmitted from the corresponding buffer; determining, at the network switch, the packet transmission rate of the data blocks based on the transmission scheme; and routing the data blocks received by the network switch to an output port of the network switch at a pre-determined time based on the transmission scheme.

According to yet a further aspect of the invention, there is provided a system for controlling packet flow in a network, the system comprising: a plurality of buffers each of the buffers being configured to store a plurality of packets, the packets originating from at a single application and each of the packets comprising one or more payloads; a plurality of flow controllers, each of the flow controllers being associated with one of the buffers and each of the flow controllers being configured to select a transmission scheme based on a payload rate for the payloads arriving at the buffer, wherein the transmission scheme includes data blocks comprising packets each, having an associated payload, the data, blocks having a variable packet transmission rate and a variable payload per packet ratio, and the product of the variable packet transmission rate and the variable payload per packet ratio remains constant; and a network switch with inputs coupled to the flow controllers, the network switch being configured to: determine a plurality of transmission schemes, each of the transmission schemes being associated with the corresponding buffer that stores the plurality of packets originating from an application; determine, an expected time of arrival of each of the data blocks transmitted from the corresponding buffer; determine the packet transmission rate of the data blocks based on the transmission scheme; and route the data blocks received by the network switch to an output port of the network switch at a pre-determined time based on the transmission scheme.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only, with reference to the accompanying figures, in which.

DETAILED DESCRIPTION

The follow n detailed description, and associated drawings, is intended to describe preferred embodiments of the invention, and is not intended to represent the only forms in which the invention may be practised. It is to be understood that the same or equivalent functions may be accomplished by different embodiments of the invention.

Figure 1:
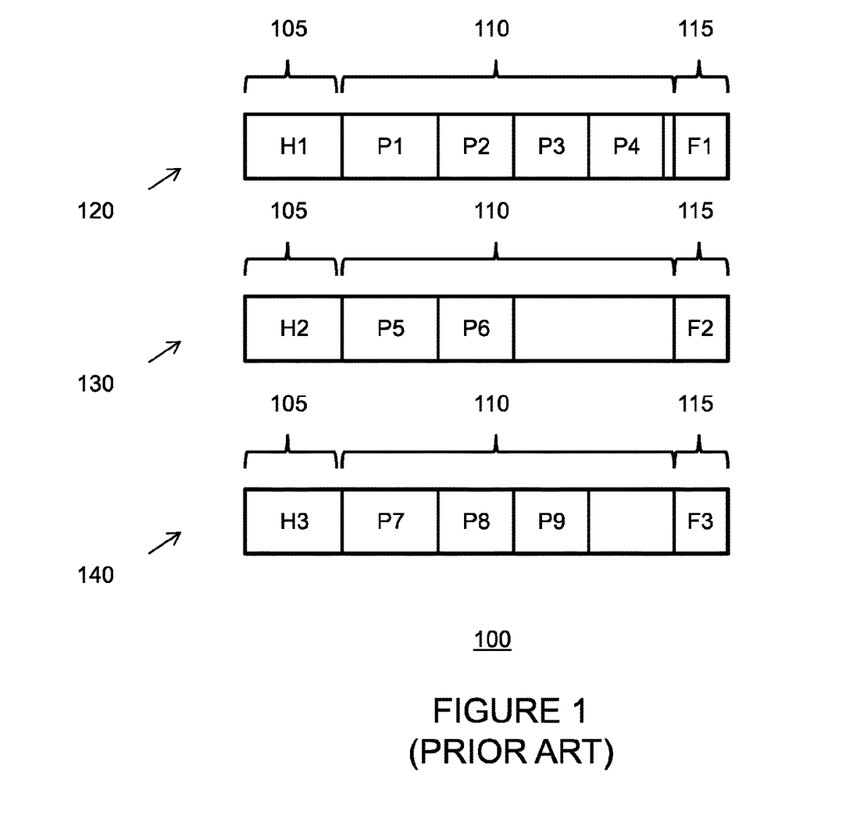
FIG. 1 is a schematic diagram of plurality of prior art packets 100 originating from a single application.

Referring to FIG. 1 there is illustrated a schematic diagram of a plurality of prior art packets 100 originating from a single application. The single application can be, for instance, a video stream, an email message, instant messaging data, data files, audio streams or any other application as will be apparent to a person skilled in the art. In one embodiment each of the packets 100 typically have a header field 105, a payload field 110 and a footer field 115. The header field 105 typically contains: information identifying an application type such as an email message; the sender's Internet Protocol (IP) address; the intended receiver's IP address; protocol information; and packet number and packet length. The footer field 105 typically contains an error checking code and optional end of packet information. The payload field 110 typically contains fixed length payloads P and the bit length L of the packets 100 may be fixed or variable. When the bit length L of the packets 100 is fixed, some of the bits in the payload field 110 may be unused but there is no need for the end of packet information in the footer field 115; whereas when the bit length L of the packets 100 is variable, all the of the bits in the payload field 110 can be used but the end of packet information is required in the footer field 115.

In FIG. 1 three fixed length packets 120, 130 and 140 are shown. Packet 120 includes a header H1, a footer F1 and four packets P1 to P4 that almost completely fill the payload field 110. Packet 130 includes a header H2, a footer F2 and two packets P5, P6 that only fill about half of the payload field 110. Also, packet 140 includes a header H3, a footer F3 and three packets P7, P8, and P9 that fill about three quarters of the payload field 110. As will be apparent to a person skilled in the art, the packets 120, 130, 140 originate from a single application. The single application can be, for instance, a video stream, an email message, instant messaging data, data files, audio streams or any other application as will be apparent to a person skilled in the art.

Figure 2:
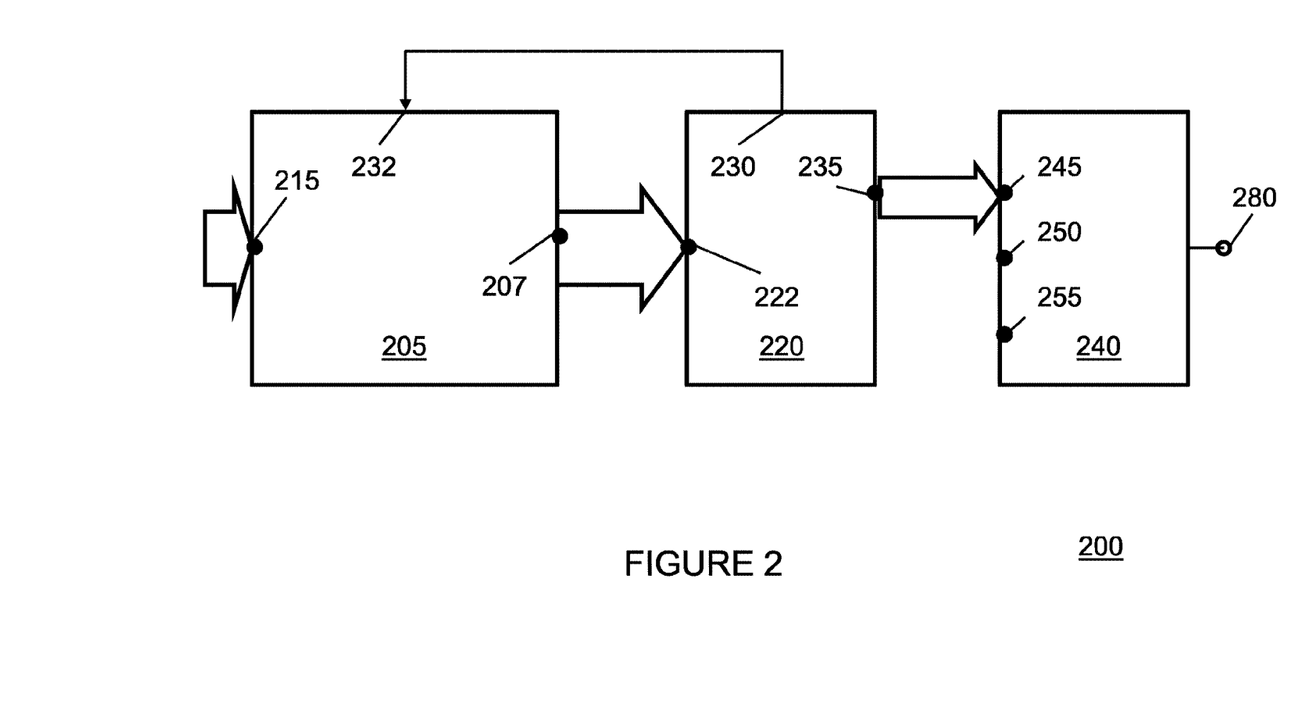
FIG. 2 is a schematic diagram of a processor for controlling packet flow in a network, according to an embodiment of the invention.

Referring to FIG. 2 there is illustrated a schematic diagram of processor 200 for controlling packet flow in a network, according to an embodiment of the invention. The processor 200 includes a buffer 205 for storing a plurality of packets 100 received at an input data port 215. There is a flow controller 220 with an input port 222 coupled by a bus to an output port 207 of the buffer 205. The flow controller 220 has a control output 230 coupled to a buffer control input 232 and an flow controller output port 235 is coupled to an input port 245 of a network switch 240. The network switch 240 also has further input ports 250 and 255 and may also have many more such input ports as will be apparent to a person skilled in the art. Furthermore, the network switch 240 has an output port 280 and in operation the switch selectively multiplexes the input ports 145, 150 and 155 to the output bort 180.

Figure 3:
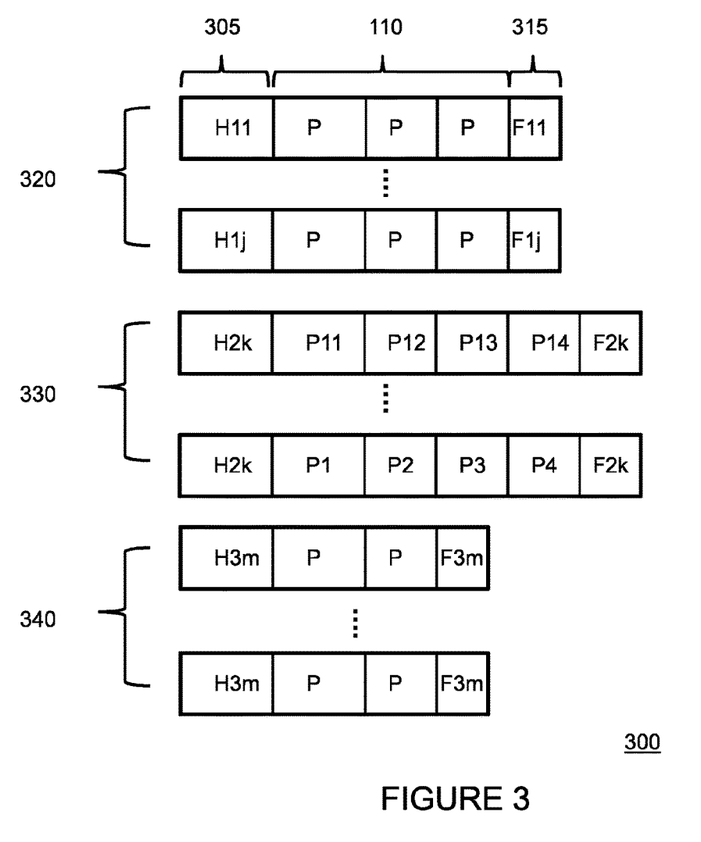
FIG. 3 is a schematic diagram of three data blocks, according to an embodiment of the invention.

In operation, the buffer 205 stores the plurality of packets 100 originating from a single application in which each of the packets comprises one or more payloads P. The flow controller 220 is configured so that, in operation, it identifies a transmission scheme TS based on a payload rate PR for the payloads P arriving at the input data port 215 of the buffer 205. The transmission scheme TS includes data blocks 300 as illustrated in FIG. 3 which are created by the flow controller 220 and sent to the network switch 240 according to the transmission scheme TS. It should also be noted that the buffer size may also be determined by the transmission scheme T.

Referring to FIG. 3 there is shown a schematic diagram of three data blocks 320, 330, 340, according to an embodiment of the invention. Each of the data blocks 320, 330, 340 comprises one or more packets and each of the packets has an associated payload P. Each of the data blocks 320, 330, 340 have a modified header field 305 can be just a packet sequence number PN and a modified footer field 315 which can just include an error checking code.

Each of the data blocks 320, 330, 340 also have a variable (different) packet transmission rate and a variable (different) payload per packet ratio, and the product of the variable packet transmission rate and the variable payload per packet ratio remains constant. Thus, as shown there are three types of data blocks 320, 330, 340 that have different payload per packet ratios and data block 310 includes j packets, data block 320 includes k packets and data block 330 includes m packets.

Figure 4:
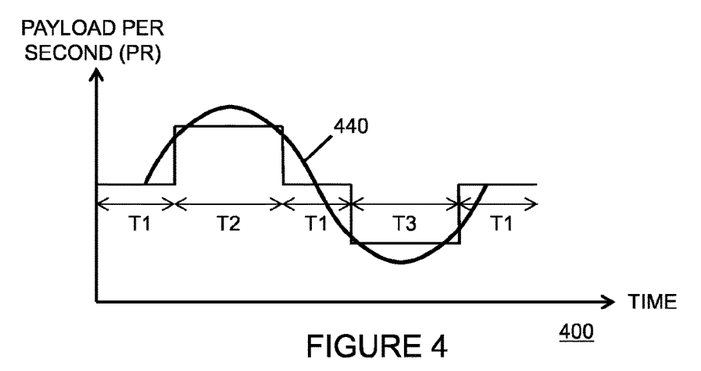
FIG. 4 is a waveform illustrating one cycle of the transmission scheme TS according to an embodiment of the invention.

In FIG. 4 there is shown a waveform 400 illustrating one cycle of the transmission scheme TS according to an embodiment of the invention. The waveform 400 includes three data block sequences that by way of example are the blocks 320, 330, 340. Data 320, 330, 340 are transmitted at different payload rates PR for different periods T1, T2 and T3. More specifically, at periods T1 the data blocks 320 are transmitted, data blocks 330 at transmitted at periods T2 and data blocks 340 are transmitted at periods T3. The waveform 400 illustrates that the transmission scheme TS comprises selecting an initial variable packet (which determined the payload rates PR) and thereafter sequentially selects further variable packet transmission rates and corresponding variable payload per packet ratios.

The sequentially selecting of the variable (different) packet transmission rates gradually increases and then decreases the number of payloads P stored in the buffer 205. The sequentially selecting also gradually increases and then decreases the number of payloads per packet during a cycle of the waveform 400 which is based on a sinusoidal function as indicated by the sinusoidal waveform 440. The increase and then decrease in the number of payloads P stored in the buffer 205 has a frequency of oscillation or resonant frequency $\omega_n$ based on the storage capacity CB of the buffer 205 and required payload flow rate of the application.

Figure 5:
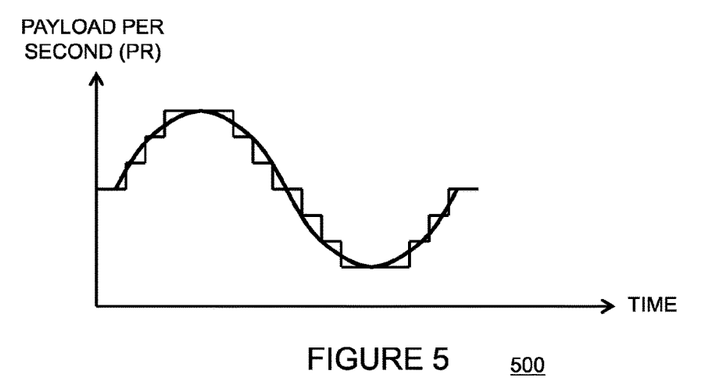
FIG. 5 is a waveform illustrating one cycle of the transmission scheme TS according to another embodiment of the invention.

In FIG. 5 there is illustrated another embodiment of a transmission scheme TS waveform cycle which has far more time periods per waveform cycle than that of the cycle of FIG. 4.

Referring back to FIG. 2 in operation the buffer 205 receives a payload per packet ratio of $R_{IN}$ and the output from the flow controller 220 (output port 235) provides a payload per packet ratio $R_{OUT}$ which is equal to $R_{IN}-R_F$ where $R_F$ is a function of the flow controller 220. Without the flow controller 220, the buffer 205 would receive an input packet per second ratio $P_{IN}$ and provide a stream of packets to the network switch 240 of size B at a payload per packet ratio of $R_{IN}$, where $$R_{IN} = R_B = \frac{1}{B}\int P_{IN}(t)dt.$$

However, the flow controller 220 provides an output packet per second ratio $P_{OUT}$ with a payload per packet ratio $$R_{OUT} = \frac{1}{B}\int P_{OUT}(t)dt.$$

Also, $$R_F = F\frac{dP_{OUT}(t)}{dt}$$

and by using a Laplace transfer function based on a resonant frequency of $\omega_n^2=(BF)^{-1}$, where F is the flow rate allowed by the flow controller 220, the functionality H(s) of the flow controller 220 in the frequency or Laplace domain can be described as:

$$H(s) = \frac{\overline{P}_{OUT}(s)}{\overline{P}_{IN}(s)} = \frac{\omega_n^2}{s^2 + \omega_n^2}.$$

Since the resonant frequency is low compared to the packet arrival rate at the buffer 206, the response observed in the buffer 206 will be that of the average number of packets $\overline{P}$ in the buffer 205 which will be ideally 50% of the buffer capacity and thus the output packet per second ratio $P_{OUT}=\overline{P}(1-\cos(\omega_n t))$. Accordingly, the buffer 205 collects a multitude of packets in a period of instances into a longer payload per packet R. The flow controller 220 divides a long payload per packet into multiple packets per second depending on the network workload. The directly opposing nature of the functions of these two components creates traffic oscillation patterns within packet transmission. The buffer factor B is the collection of packets and measures the level of traffic load in the network, while the flow controller increases or decreases the packet flow rate F based on the traffic load. These varying transmission patterns create a critical time response window between workload (packet size) and channel division management (packets per second). Oscillating traffic is managed within network switches and physical packet queuing buffers to deliver deterministic arrival rate transmission.

Figure 6:
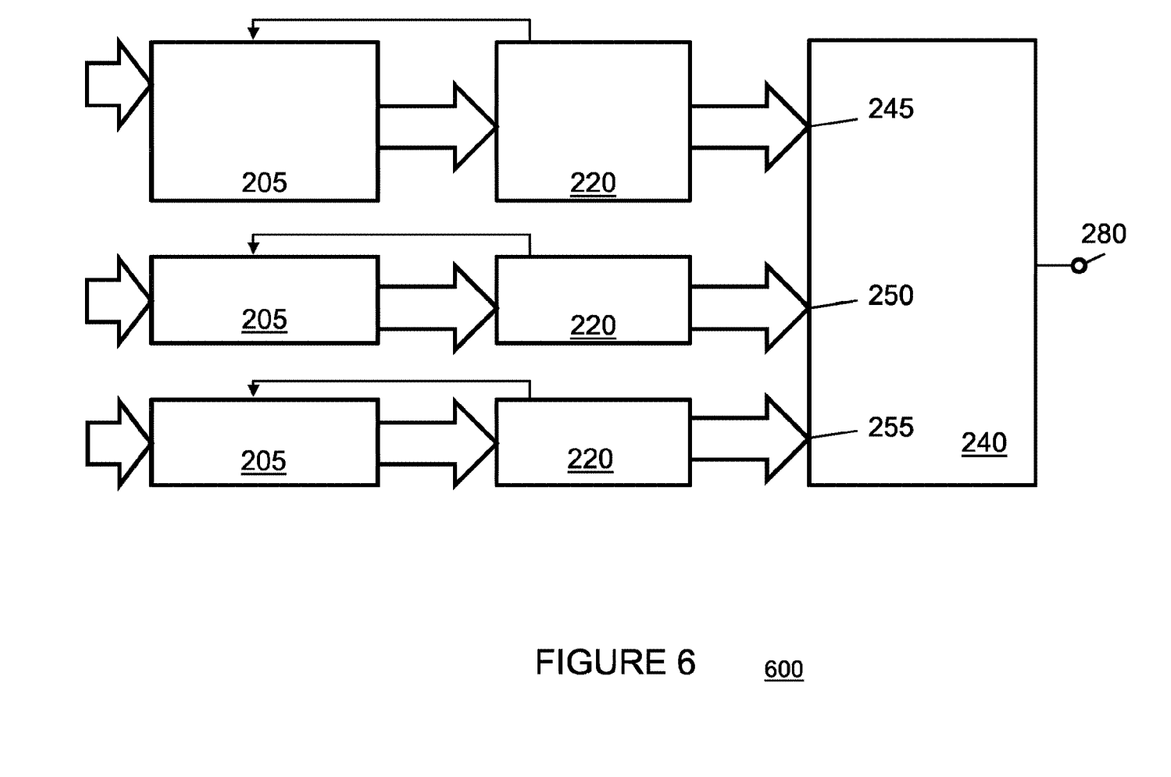
FIG. 6 is a schematic block diagram of a system for controlling packet flow in a network according to an embodiment of the present invention.

In FIG. 6 there is illustrated a schematic block diagram of a system 600 for controlling packet flow in a network, according to an embodiment of the present invention. The system 600 includes a plurality of buffers and flow plurality of flow controllers 205, 220 coupled to respective input ports 245, 250, 255 of the network switch 240. The network switch 240 is configured to determine a plurality of transmission schemes TS, each of the transmission schemes TS being associated with the corresponding buffer 106 that stores the plurality of packets originating from an application. The network switch 240 determines, the packet transmission rate of the data blocks based on the transmission scheme TS, then it receives the data blocks; and routes the data blocks to output port 280 of the network switch 240 at a pre-determined time based on the transmission scheme TS. More specifically, the network switch 240 prioritizes the routing so that the routing of data blocks with the lowest payload rates PR are routed before data blocks with higher payload rates PR.

Figure 7:
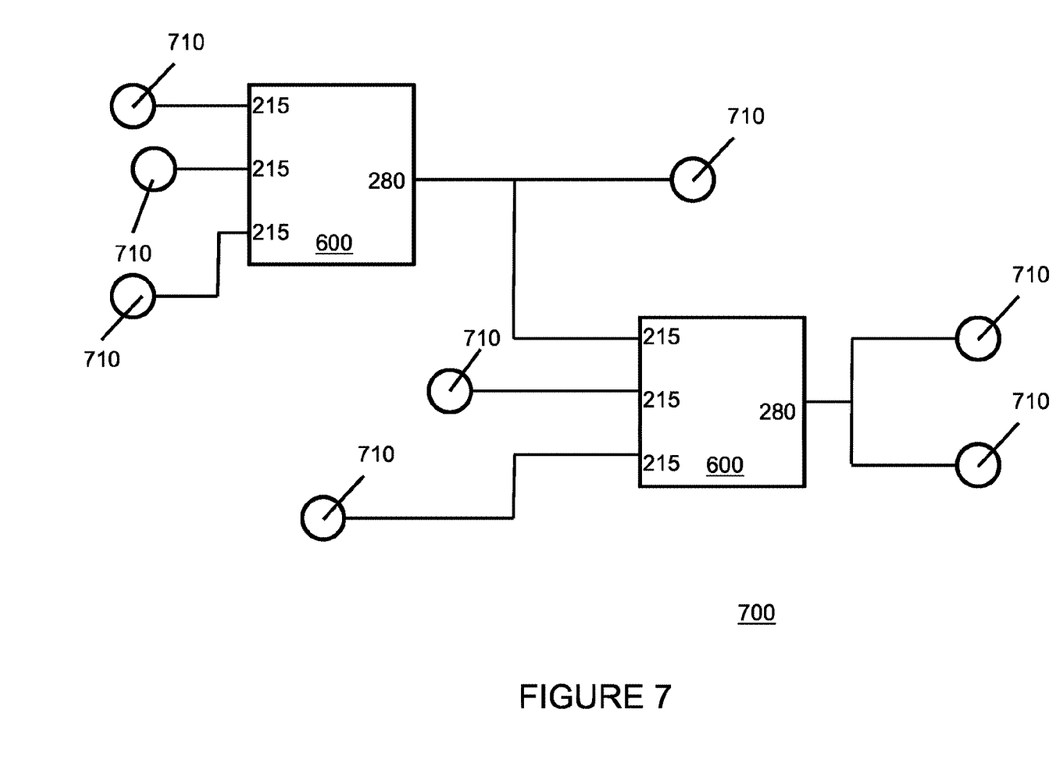
FIG. 7 illustrates a network according to an embodiment of the present invention.

In FIG. 7 there is illustrated a network 700 comprising at least one processor 200 according to an embodiment of the present invention. The network includes nodes 710 and interconnectors 715 (Ethernet links or any other network links) in which some of the nodes are implemented by the system 600. Also, the interconnectors 715 have a limited bandwidth as will be apparent to persons skilled in the art and thus limit the maximum payload transmission rate.

Figure 8:
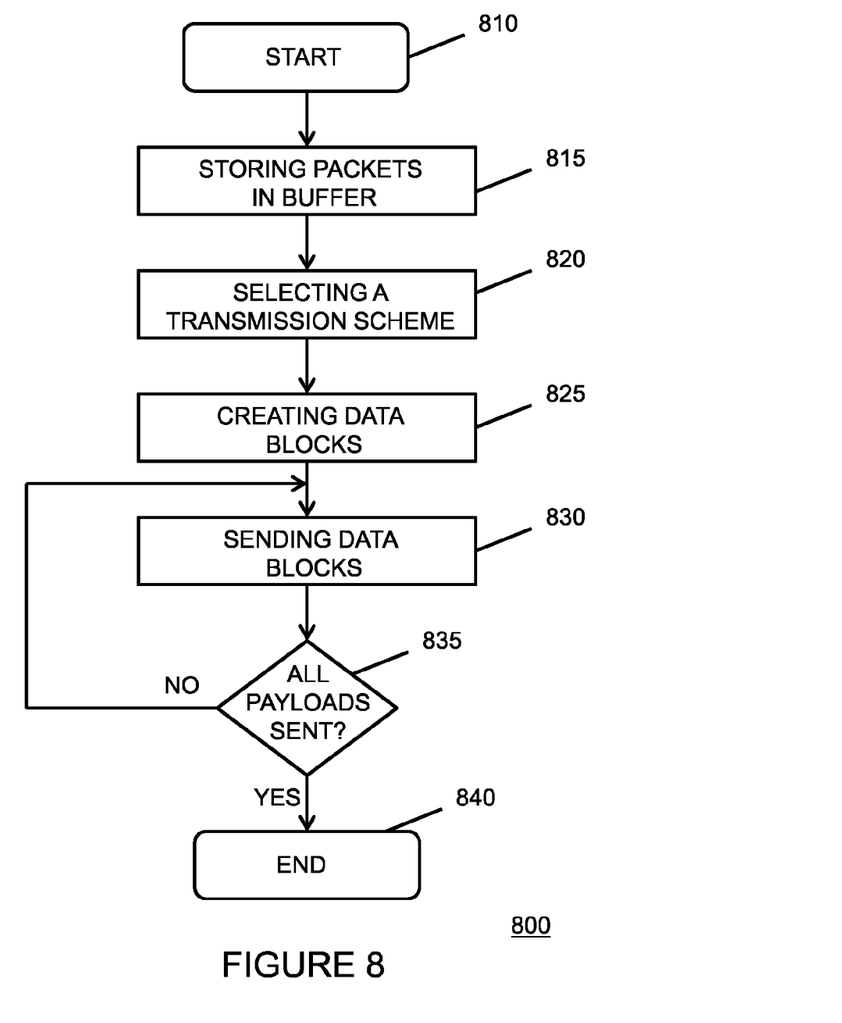
FIG. 8 is a flow chart illustrating a method for controlling packet flow in a network according to an embodiment of the invention.

Referring to FIG. 8 there is shown a flow chart illustrating a method 800 for controlling packet flow in a network according to an embodiment of the invention. The method 800 is typically implemented by the processor 200 at a start block 810 commences receiving data packets, such as the packets 100 and at a storing block 815 the packets 100 are stored in the buffer 205 as they arrive at the input data port 215. At a selecting block 820 the flow controller 220 selects a transmission scheme based on a payload rate for the payloads arriving at the buffer 205. The transmission scheme TS includes data blocks, such as data blocks 320, 330, 340, comprising packets each having an associated payload, the data blocks having a variable packet transmission rate and a variable payload per packet ratio, and the product of the variable packet transmission rate and the variable payload per packet ratio remains constant. As described above, the header fields 305 of the packets can be just a packet sequence number PN and at creating block 825 the data blocks 320, 330, 340 are sequentially created.

As the data blocks 320, 330, 340 are created they are sent, at a sending block 830, to the network switch 240 according to the selected transmission scheme TS. However, at the sending block 830 an initial packet INP is sent to the network switch 240 which is normally the first packet stored in the buffer at block 815 and thus the network switch 240 can identify the transmission scheme TS. A test block 835 then determines if all payloads have been sent, this is determined for example by reading an end of packet sequence flag in the header fled of the incoming received data packets or by counting the number of payloads sent. If more payloads are to be sent the method returns to block 830 otherwise the method terminates at an end block.

From the above, it will be apparent that the method 800 performs selecting an initial said variable packet transmission rate and corresponding initial said variable payload per packet ratio. The method then sequentially selects further variable packet transmission rates and corresponding variable payload per packet ratios. The sequentially selecting gradually increases and then decreases: a) the number of payloads stored in the buffer 205; and b) the number of payloads per packet. As mentioned above, the increase and then decrease in the number of payloads stored in the buffer is based on the sinusoidal function as indicated by waveforms 400 and 500. Thus, the increase and then decrease in the number of payloads stored in the buffer 205 has a frequency of oscillation based on the storage capacity of the buffer and required payload flow rate of the application.

Since the network switch 240 has identified the transmission scheme TS, the network switch 240, based on the transmission scheme TS, determines an expected time of arrival of each of the data blocks and the packet transmission rate of the data blocks The network switch 240 therefore receives the data blocks and routes the data blocks to the output port 280 at a pre-determined time based on the transmission scheme TS.

Figure 9:
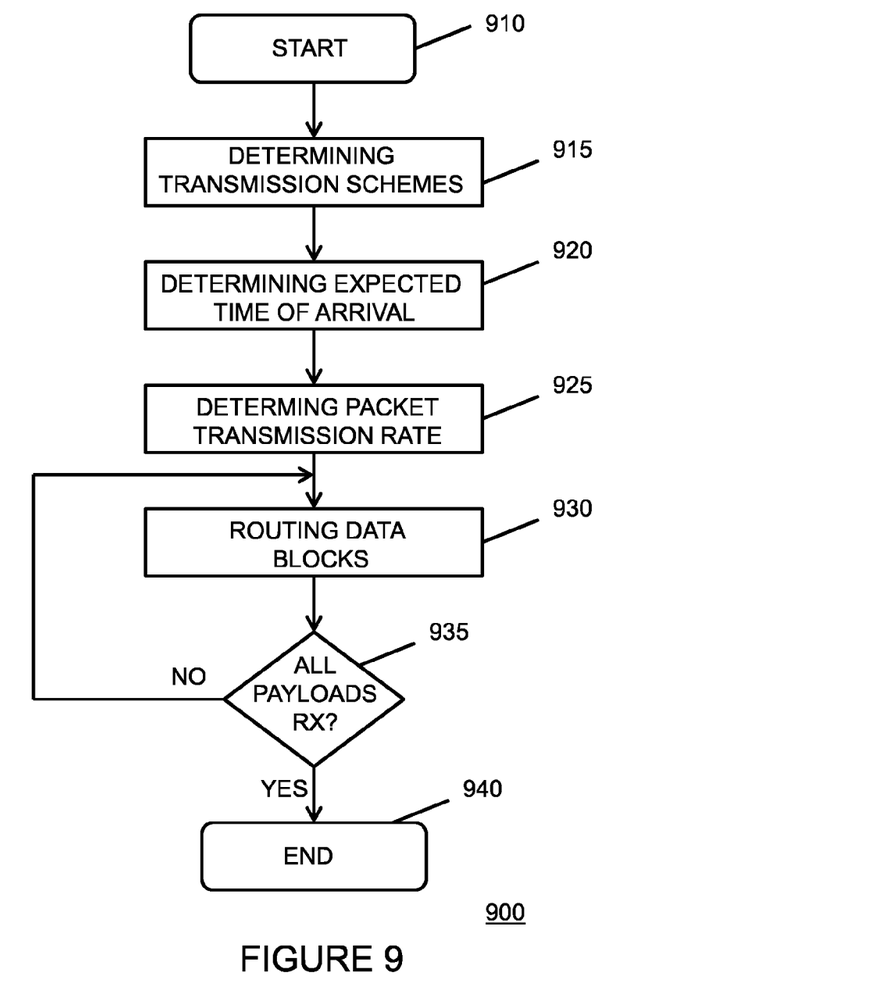
FIG. 9 is a flow chart illustrating a method for controlling packet flow in a network according to an embodiment of the invention.

In FIG. 9 there is a flow chart illustrating a method 900 for controlling packet flow in a network, according to an embodiment of the invention. The method 900 is typically performed by network switch 240 of the system 600, and is initiated at a start block 910 when the flow controller 220 sends the initial packet INP. Based on the initial packet INP, from each of the flow controllers 220 connected to the respective input ports 245, 250 and 255, a determining block 915 determines the plurality of transmission schemes TS. Each of these transmission schemes TS is associated with a corresponding buffer 205 that stores a plurality of packets originating from a respective single application and each of the packets comprises one or more payloads. Also, each of the transmission schemes TS is based on a payload rate for the payloads arriving at the corresponding buffer 205, and each transmission scheme TS includes data blocks comprising packets each having an associated payload. Furthermore, the data blocks have a variable packet transmission rate and a variable payload per packet ratio, and the product of the variable packet transmission rate and the variable payload per packet ratio remains constant.

At a block 920 there is determined an expected time of arrival of each of the data blocks transmitted from the corresponding buffer 205 and a block 925 determines the packet transmission rate of the data blocks based on the transmission scheme TS. At a block 930 there is performed a process of routing the data blocks received by the network switch 240 to the output port 280 at a pre-determined time based on the transmission scheme TS. In this regard, the network switch 240 prioritizes the routing so that the routing of data blocks with the lowest payload rates are routed before data blocks with higher payload rates. A test block then determines if there are still more payloads to be received. If more payloads are to be received the method 900 returns to block 930 otherwise the method 900 terminates at an end block 940. The method 900 can be repeated by other nodes in a network such as network 700 and as such the network 700 network sends the data blocks, based on the transmission scheme TS between the nodes 710. Since the nodes can determine the transmission scheme TS in a similar fashion to the method 900 efficient utilisation of network bandwidth can be advantageously achieved since the overheads associated with payload bundles can be reduced. Furthermore, the deterministic time of arrival of the packets and the know format of the packets is known allows efficient processing and routing. In addition, if the physical link capacity bandwidth of the network 700 is less than the required bandwidth at the output port 280 of the network switch 240, the transmission rate (payload per second) of each transmission scheme TS is reduced by a constant factor K to reduced network congestion.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise, Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also, any embodiments which fail within the scope of the claims.

The invention claimed is:

1. A method for controlling packet flow in a network, the method comprising:
   storing a plurality of packets in a buffer, the packets originating from a single application and each of the packets comprising one or more payloads;
   selecting by a flow controller a transmission scheme based on a payload rate for the payloads arriving at the buffer, wherein the transmission scheme includes data blocks comprising packets each having an associated payload, the data blocks having a variable packet transmission rate and a variable payload per packet ratio, and the product of the variable packet transmission rate and the variable payload per packet ratio remains constant;
creating the data blocks; and
sending the data blocks to a network switch according to the transmission scheme.

2. The method of claim 1, wherein the transmission scheme comprises:
selecting an initial said variable packet transmission rate and corresponding initial said variable payload per packet ratio; and thereafter
sequentially selecting further variable packet transmission rates and corresponding variable payload per packet ratios.

3. The method of claim 2, wherein the sequentially selecting gradually increases and then decreases the number of payloads stored in the buffer.

4. The method of claim 2, wherein the sequentially selecting gradually increases and then decreases the number of payloads per packet.

5. The method of claim 4, wherein the increase and decrease in the number of payloads stored in the buffer is based on a sinusoidal function.

6. The method of claim 5, wherein the increase and decrease in the number of payloads stored in the buffer has a frequency of oscillation based on the storage capacity of the buffer and required payload flow rate of the application.

7. The method, as claimed in claim 1, further including:
identifying, at the network switch, the transmission scheme.

8. The method, as claimed in claim 7, further including:
determining, at the network switch, an expected time of arrival of each of the data blocks.

9. The method, as claimed in claim 8, wherein the expected time of arrival is determined from the transmission scheme.

10. The method, as claimed in claim 9, further including:
determining the packet transmission rate of the data blocks based on the transmission scheme.

11. The method, as claimed in claim 10, further including:
receiving the data blocks at the network switch; and
routing the data blocks to an output port at a pre-determined time based on the transmission scheme.

12. A processor for controlling packet flow in a network, the processor comprising:
a buffer for storing a plurality of packets, the packets originating from a single application and each of the packets comprising one or more payloads; and
a flow controller configured to:
select a transmission scheme based on a payload rate for the payloads arriving at the buffer, wherein the transmission scheme includes data blocks comprising packets each with an associated payload, the data blocks having a variable packet transmission rate and a variable payload per packet ratio, and the product of the variable packet transmission rate and the variable payload per packet ratio remains constant;
create the data blocks; and
send the data blocks to a network switch.

13. The processor as claimed in claim 12, wherein the transmission scheme comprises:
selecting an initial said variable packet transmission rate and corresponding initial said variable payload per packet ratio; and thereafter
sequentially selecting further variable packet transmission rates and corresponding variable payload per packet ratios.

14. The processor as claimed in 13, wherein the sequentially selecting gradually increases and then decreases the number of payloads stored in the buffer.

15. The processor as claimed in claim 13, wherein the sequentially selecting gradually increases and then decreases the number of payloads per packet.

16. The processor as claimed in claim 12, further including the network switch and wherein the network switch is configured to identify the transmission scheme.

17. The processor as claimed in claim 16, wherein the network switch is configured to determine an expected time of arrival of each of the data blocks.

18. The processor as claimed in claim 17, wherein the expected time of arrival is determined from the transmission scheme.

19. A method for controlling packet flow in a network, the method including:
determining at a network switch a plurality of transmission schemes, each of the transmission schemes being associated with a corresponding buffer that stores a plurality of packets originating from a respective single application and each of the packets comprising one or more payloads, wherein each of the transmission schemes is based on a payload rate for the payloads arriving at the corresponding buffer, and wherein each transmission scheme includes data blocks comprising packets each having an associated payload, the data blocks having a variable packet transmission rate and a variable payload per packet ratio, and the product of the variable packet transmission rate and the variable payload per packet ratio remains constant;
determining, at the network switch, an expected time of arrival of each of the data blocks transmitted from the corresponding buffer;
determining, at the network switch, the packet transmission rate of the data blocks based on the transmission scheme; and
routing the data blocks received by the network switch to an output port of the network switch at a pre-determined time based on the transmission scheme.

20. The method as claimed in claim 19, wherein the network switch prioritizes the routing of data blocks with the lowest payload rates, which are routed before data blocks with higher payload rates.

* * * * *